Sept. 7, 1965 F. C. GUSTAFSON 3,204,484
SPIDER DRIVE ROTARY VALVE ACTUATING MECHANISM
Filed Nov. 16, 1962 2 Sheets-Sheet 1
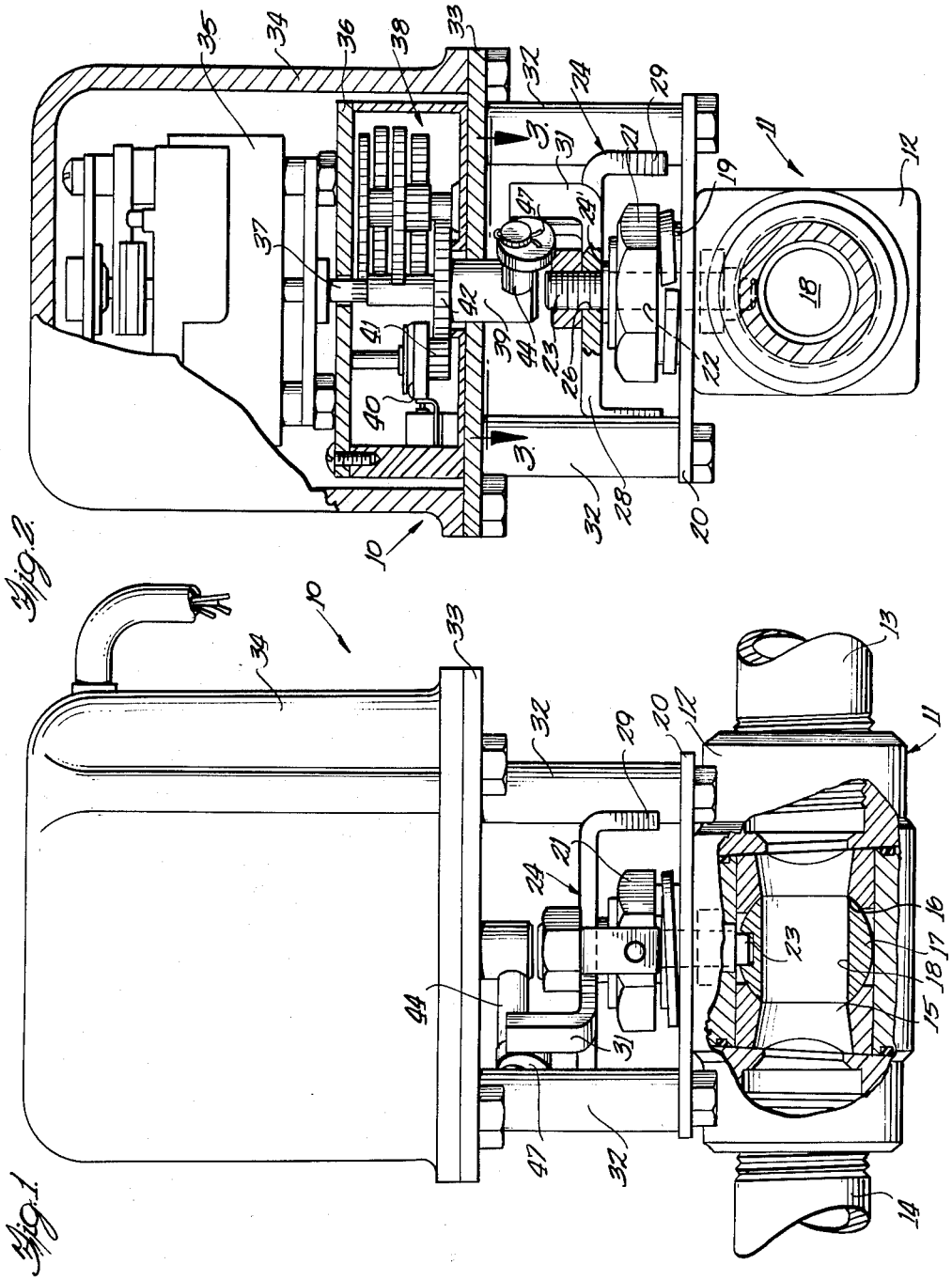

Sept. 7, 1965 F. C. GUSTAFSON 3,204,484
SPIDER DRIVE ROTARY VALVE ACTUATING MECHANISM
Filed Nov. 16, 1962 2 Sheets-Sheet 2

Inventor
Floyd C. Gustafson
Helmand O. Vogel
Attorney

United States Patent Office 3,204,484
Patented Sept. 7, 1965

3,204,484
SPIDER DRIVE ROTARY VALVE ACTUATING MECHANISM
Floyd C. Gustafson, Lake Zurich, Ill., assignor to Calco Manufacturing Company, a corporation of Illinois
Filed Nov. 16, 1962, Ser. No. 238,132
6 Claims. (Cl. 74—625)

This invention relates to a rotary valve actuating mechanism and more particularly relates to an improved drive connection between an electric motor and a ball-type valve.

A primary object of this invention is to provide an improved drive connection between an electric motor and a rotary valve for opening and closing said valve.

Another object is to provide an improved rotary drive mechanism for rotating a valve, the said mechanism accommodating any misalignment which may occur between the drive shaft of an electric motor and the valve stem of the rotary valve.

A still further object is to provide an improved rotating connection between the shaft of an electric motor and the stem of a rotary valve, the said connection providing for opening and closing the valve and for permitting independent manual operation of the valve in the event of electric motor failure.

A still further object is to provide an improved rotating connection between the shaft of an electric motor and the stem of a rotary valve, the said connection providing for opening and closing the valve and for permitting independent manual operation of the valve in the event of electric motor failure.

A still further object is to provide an improved and simplified connection between the rotating shaft of an electric motor and the valve stem of a valve for opening and closing the valve, the said rotating connection including means for indicating the open and closed positions of the valves and also including means providing for rotation of the valve stem independently of the motor during stopping of the motor.

These and further objects will become more readily apparent from a reading of the specification when examined in connection with the accompanying sheets of drawings.

FIGURE 1 is a side elevational view partially in section showing a valve actuating mechanism;

FIGURE 2 is an end elevational view of the valve actuating mechanism shown in FIGURE 1 with portions broken away to illustrate the invention;

Figure 3:
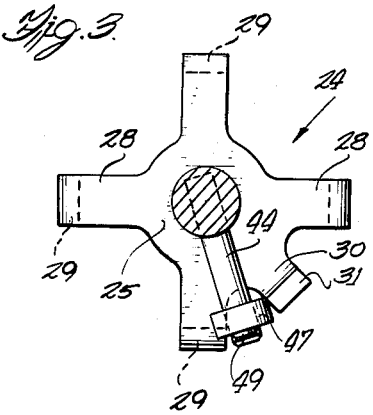
FIGURE 3 is a cross sectional view taken substantially along the line 3—3 of FIGURE 2.

Referring now particularly to FIGURES 1 and 2 a valve actuating mechanism is generally designated by the reference character 10. The actuating mechanism 10 is provided to actuate a conventional ball-type valve generally designated 11. The ball-type valve 11 comprises a valve housing 12 having fluid conduits 13 and 14 adapted to communicate with a valve passage 15 within the housing 12. The housing 12 also includes a conventional valve seat 16 which may be opened and closed by means of a ball-type valve element 17. The ball valve element 17 is provided within an opening or bore 18 adapted to provide communication through conduits 13 and 14.

The top of the valve housing 12 is provided with an upwardly extending threaded boss 19 on which an apertured mounting plate 20 is positioned and is rigidly connected thereto by means of a nut 21. The boss 19 is provided with a vertical bore 22 within which a valve stem 23 is rotatably positioned. The valve stem 23 is rigidly connected to the ball valve element 17 for rotating the same to achieve opening and closing of the valve seat 16 for opening and closing communication between the conduits 13 and 14.

Figure 4:
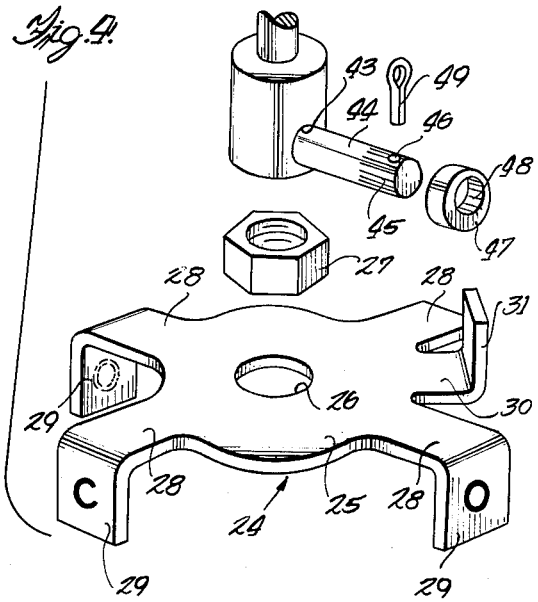
FIGURE 4 is an exploded detail view of portions of a driving shaft and spider connection of a valve actuating mechanism.

As best shown in FIGURES 1, 3 and 4 a spider 24 includes a central portion 25 having an opening 26 which receives the upper end of the stem 23 and is rigidly connected to the stem 23 so as to provide movement of the stem 23 which the spider 24 is rotated. The nut 27 rigidly secures the spider 24 against a washer 24' rigidly secured to the stem 23. The spider 24 comprises radially extending arms 28 having downwardly extending tangs 29. An arm 30 extends between two of the arms 28 and includes an upwardly extending driving tang 31.

A plurality of posts 22 are suitably mounted on the plate 20 and extend upwardly with respect thereto. The posts 32 support thereon a horizontal plate 33 on which a motor housing 34 is securely positioned. A motor 35 is disposed within the housing 34 the said motor being conventional. A mounting structure 36 supports the motor 35 within the housing 34. The motor is provided with a shaft 37 having gear teeth at one end which in turn drives a suitable reduction gearing generally designated by the reference character 38. The reduction gear 38 in turn drives, at a reduced speed, a drive shaft 39 which is also shown in FIGURE 4. The gearing 38 also drives a cam actuated switch 40 by means of gears 41 and 42 as best indicated in FIGURE 2.

Referring now particularly to FIGURE 4 a horizontal bore in the shaft 39 is indicated at 43 and an arm or pin 44 is rigidly secured within the bore 43. The end of the pin 44 is provided with a splined portion 45 which has a vertical hole 46. A drive disk 47 has a splined eccentrically positioned bore 48 and the said disk 47 is secured to the splined portion 45 by means of a cotter key 49 secured in the hole 46.

In the operation, the electric motor 35 is driven by a suitable source of power upon the actuation of a switch which causes rotation of the gear train 38 which in turn causes rotation of the shaft 39. The cam switch 40 is effective to connect an electrical energy source to the motor 45 until the shaft 39 has been rotated 90°. As the shaft 39 rotates the drive disk 47 contact with the upwardly extending tang 31 causes rotation of the spider 24, the stem 23 in turn rotating the valve element 17 from the position shown in FIGURE 1 to a closed position. At this point the cam switch 40 is de-energized and operation of the motor stops until a predetermined time when the cycle is repeated to open the valve as desired. It is, of course, obvious that timing devices, etc., may be utilized whereupon the operation of the valve may occur at time intervals, if desired. Such operation is well contemplated within the present invention.

If desired, adjustment between the tang 31 and the drive disk 47 may be quickly arranged by withdrawing the cotter key 49 and moving the eccentric disk to the desired position on the splined end portion 45 of the shaft 44. Further, it is to be noted that any mislaginment with respect to concentricity of the shaft 39 and the stem 23 is of no great problem since such misalignment will not interfere with the proper function of the valve drive mechanism.

In the event that the motor ceases to function, it is a simple matter for the operator to manually grasp any one of the tangs 29 and rotate the valve stem 23 in the same desired direction completely independently of the motor or gear drive. Also it is to be noted that the tangs 29 serve as a suitable indicator, indicating the open and closed positions of the valve. In FIGURE 4 it is noted that the tangs include the letter C and letter O, so that the operator can easily tell whether the valve is open or closed.

Figure 5:
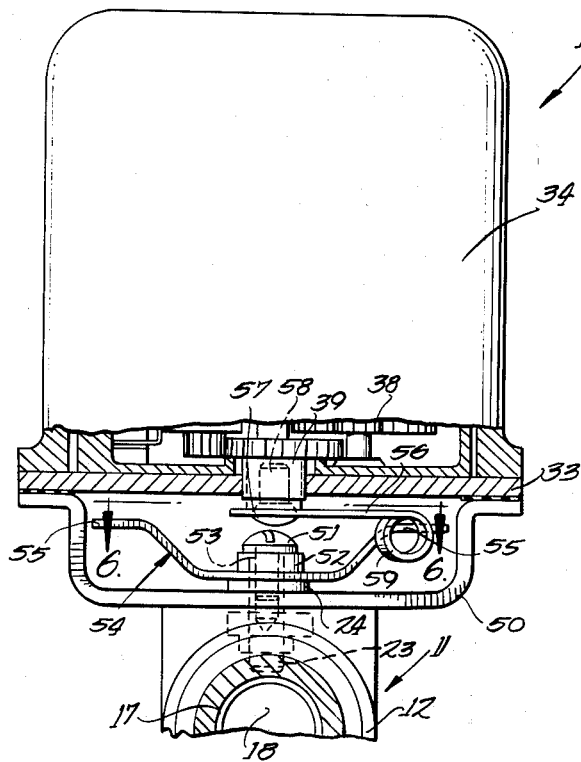
FIGURE 5 is a view similar to FIGURE 2 showing a modification of a driving connection between an electric motor and a ball-type valve.
Figure 6:
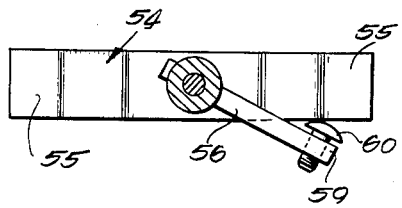
FIGURE 6 is a detail sectional view taken along the line 6—6 of FIGURE 5.

The modification shown in FIGURES 5 and 6 is similar and where the parts are the same the same reference characters are utilized. In this modification a mounting plate 50 is suitably secured to the valve 12 which in turn rigidly supports the plate 13 and housing 34. A screw 51 extends through a washer 52 into a bore 53 within the stem 23. The washer 24' is again rigidly secured to the stem 23 and thus upon tightening of the screw 51 and actuating bar 54 is rigidly secured to rotate the stem 23. The actuating bar 54 includes upwardly and outwardly extending opposed portions 55. An arm 56 is suitably connected to the shaft 39 by means of a screw 57 extending into a threaded bore 58 within the shaft 39. The outer end of the arm 56 is provided with a loop 59 which is threaded and within which a screw 60 is adjustably positioned.

Thus, as shown in FIGURE 6, the arm 56 and its position relative to the actuating bar 54 may be adjusted by merely rotating the screw 60 which engages one of the portions 55 of the bar 54 for rotating the ball valve 17.

Operation of the modification is the same as mentioned in the above disclosure. As the screw 60 is moved with the arm 56 it engages one of the portions 55 rotating the bar 54 and thus, in turn, moving the ball valve to a closed or open position. In the event of motor failure the bar 54 also may be rotated to open or close the valve independently of the motor.

Thus it is obvious that the objects of the invention have been achieved. A simple and yet effective connection is provided between the electric motor and the valve stem for actuating the valve stem so that it is actuated by the motor or independently by manual control if desired. It is believed that further changes and modifications may be made without departing from the spirit of the invention as disclosed or from the scope thereof as defined in the appended claims.

What is claimed is:
1. A coupling for a motor and valve assembly with said motor including a driver shaft, and said valve including a rotatably driven stem for rotating said valve to open and close the same, said stem being coaxially positioned with respect to said driver shaft, comprising,
  (a) an arm connected to said shaft, rotatable therewith and extending radially outwardly with respect thereto,
  (b) an actuating member connected to said stem and including portions extending radially outwardly on opposite sides of said stem, and
  (c) engaging means on said arm and movable therewith,
  (d) said engaging means being rotatable to engage one of said opposed portions for rotating said stem during rotation of said shaft,
  (e) said other opposed portion providing manual means for rotating said stem independently of said motor.

2. A coupling in accordance with claim 1, said engaging means including a rotatable element adjustable about the axis of said arm to a variety of positions relative to said one of said opposed portions.

3. A coupling in accordance with claim 2, said one opposed portion including a tang projecting toward said motor for engagement by said rotatable element, said other opposed portion including a tang projecting toward said valve to provide said manual means for rotating said stem independently of said motor.

4. A coupling in accordance with claim 2, said opposed portions being of spider shape, a tang on said spider projecting toward said motor for engagement by said rotatable element, and a plurality of tangs on said spider projecting toward said valve and providing manual means for rotating said valve independently of said motor.

5. A coupling in accordance with claim 4, said rotatable element comprising an eccentric disk rotatably connected to said arm.

6. A coupling in accordance with claim 5, said arm having a splined end portion, and said disk having a splined eccentrically located bore engaged by said splined end portion.

References Cited by the Examiner

UNITED STATES PATENTS

| | | | |
|---|---|---|---|
| 181,972 | 9/76 | Packer | 64—10 |
| 1,162,253 | 12/15 | Richard | 74—625 |
| 2,523,825 | 9/50 | Hartley | 251—130 X |
| 2,621,678 | 12/52 | Snyder | 251—130 |
| 2,848,904 | 8/58 | Wilson | 74—625 |

FOREIGN PATENTS 1,255,989    2/61    France.

BROUGHTON G. DURHAM, *Primary Examiner.*

M. CARY NELSON, *Examiner.*